(12) United States Patent
Rohrweck

(10) Patent No.: US 9,541,986 B2
(45) Date of Patent: Jan. 10, 2017

(54) ADAPTIVE SCREEN TIMEOUTS BASED ON USER PREFERENCES, INTERACTION PATTERNS AND ACTIVE APPLICATIONS

(71) Applicant: Google Inc., Mountain View, CA (US)

(72) Inventor: Florian Rohrweck, Ebensee (AT)

(73) Assignee: Google Inc., Mountain View, CA (US)

( * ) Notice: Subject to any disclaimer, the term of this patent is extended or adjusted under 35 U.S.C. 154(b) by 676 days.

(21) Appl. No.: 13/835,408

(22) Filed: Mar. 15, 2013

(65) Prior Publication Data

US 2014/0101472 A1 Apr. 10, 2014

Related U.S. Application Data

(60) Provisional application No. 61/710,983, filed on Oct. 8, 2012.

(51) Int. Cl.
*G06F 1/32* (2006.01)

(52) U.S. Cl.
CPC ........... *G06F 1/3265* (2013.01); *G06F 1/3206* (2013.01); *G06F 1/3234* (2013.01); *G06F 1/3246* (2013.01); *Y02B 60/1242* (2013.01); *Y02B 60/186* (2013.01); *Y02B 60/32* (2013.01)

(58) Field of Classification Search
CPC ...... G06F 1/1694; G06F 1/3231; G06F 3/005; G06F 3/013; G06F 1/3265; G06F 1/323; G06F 1/3206; G06F 1/3234; G06F 1/3246; H04M 1/67; H04M 2250/12; H04M 2250/22; H04M 2250/52;Y02B 60/1242; Y02B 60/186; Y02B 60/32
See application file for complete search history.

(56) References Cited

U.S. PATENT DOCUMENTS

| | | | | |
|---|---|---|---|---|
| 5,504,907 A | * | 4/1996 | Stewart | G06F 1/325 713/321 |
| 5,532,935 A | * | 7/1996 | Ninomiya | G06F 1/3203 307/31 |
| 5,542,035 A | * | 7/1996 | Kikinis | G06F 1/32 700/296 |
| 5,796,945 A | * | 8/1998 | Tarabella | G06F 17/30017 707/E17.009 |
| 7,383,457 B1 | * | 6/2008 | Knight | G06F 1/32 713/320 |

(Continued)

*Primary Examiner* — Jaweed A Abbaszadeh
*Assistant Examiner* — Terrell Johnson
(74) *Attorney, Agent, or Firm* — McDonnell Boehnen Hulbert & Berghoff LLP

(57) ABSTRACT

A computing device, such as a mobile communication device, is provided that adjusts, based on user interaction with the device, sleep times for a display to enter a sleep mode restricting use of a graphical user interface. The device includes a display providing the graphical user interface and a processor. The processor is configured to cause the display to enter the sleep mode after a sleep time without receiving any user inputs, increase the sleep time responsive to a user input received within a predetermined period of time after entry of the sleep mode and decrease the sleep time responsive to another user input directing the display to enter the sleep mode before passage of the sleep time. The processor may execute similar processes to adjust a plurality of sleep times associated with different applications and different functions within an application.

30 Claims, 3 Drawing Sheets

(56) References Cited

U.S. PATENT DOCUMENTS

| | | | |
|---|---|---|---|
| 2009/0082066 A1* | 3/2009 | Katz | G06F 1/3203 |
| | | | 455/566 |
| 2009/0312059 A1 | 12/2009 | Pratt et al. | |
| 2010/0005523 A1* | 1/2010 | Hassan | G06F 21/31 |
| | | | 726/19 |
| 2012/0015693 A1* | 1/2012 | Choi | H04M 1/72566 |
| | | | 455/566 |
| 2012/0064948 A1* | 3/2012 | Lee | H04M 1/67 |
| | | | 455/566 |
| 2012/0129496 A1* | 5/2012 | Park | G06F 3/0488 |
| | | | 455/411 |
| 2012/0131321 A1* | 5/2012 | Jitkoff | G06F 1/3203 |
| | | | 713/2 |

\* cited by examiner

ADAPTIVE SCREEN TIMEOUTS BASED ON USER PREFERENCES, INTERACTION PATTERNS AND ACTIVE APPLICATIONS

CROSS-REFERENCE TO RELATED APPLICATIONS

This application claims priority to U.S. Provisional Patent Application No. 61/710,983 filed Oct. 8, 2012, the entire disclosure of which is incorporated herein by reference.

TECHNICAL FIELD

This disclosure relates to computing devices such as mobile communication devices and, in particular, to a device that adjusts, based on user interaction with the device, sleep times for a display on the device to enter a sleep mode restricting use of a graphical user interface.

BACKGROUND

Manufacturers, retailers, and users of computing devices commonly seek ways to conserve power from batteries and other energy sources in order to increase the utility and functionality of computing devices. Computing devices therefore frequently implement a sleep mode or screen timeout in which the device enters a power saving mode in the absence of user interaction with the device within a predetermined amount of time.

BRIEF SUMMARY

A computing device in accordance with one embodiment of the present teachings includes a display providing a graphical user interface. The device further includes a memory storing a plurality of executable instructions defining a plurality of applications for the device and a plurality of sleep times. Each sleep time of the plurality of sleep times is associated with an application of the plurality of applications. The device further includes a processor configured to execute a first set of the plurality of executable instructions to implement a first application of the plurality of applications. The processor is further configured to cause the display to enter a sleep mode restricting use of a graphical user interface after a first sleep time without receiving any user inputs. The first sleep time is associated with the first application. The processor is further configured to increase the first sleep time responsive to a first user input received within a predetermined period of time after entry of the sleep mode and to decrease the first sleep time responsive to a second user input directing the display to enter the sleep mode before passage of the first sleep time.

A computing device in accordance with another embodiment of the present teachings includes a display providing a graphical user interface and a processor. The processor is configured to: cause the display to enter a sleep mode restricting use of the graphical user interface after a predetermined sleep time without receiving any user inputs. The processor is further configured to increase the sleep time responsive to a first user input received within a predetermined period of time after entry of the sleep mode and decrease the sleep time responsive to a second user input directing the display to enter the sleep mode before passage of the sleep time.

An article of manufacture in accordance with one embodiment of the present teachings includes a computer storage medium having a computer program encoded thereon that when executed by a processor in a computing device adjusts a sleep time for a display of the computing device to enter a sleep mode restricting use of a graphical user interface of the display. The computer program includes code for executing a first set of a plurality of executable instructions defining a plurality of applications for the computing device. The first set of instructions implements a first application of the plurality of applications. The computer program further includes code for causing the display to enter the sleep mode after a first sleep time without receiving any user inputs. The first sleep time is associated with the first application. The computer program further includes code for increasing the first sleep time responsive to a first user input received within a predetermined period of time after entry of the sleep mode and decreasing the first sleep time responsive to a second user input directing the display to enter the sleep mode before passage of the first sleep time.

A method in accordance with one embodiment of the present teachings for adjusting sleep times for a display of a computing device to enter a sleep mode restricting use of a graphical user interface on the display includes the step of executing a first set of a plurality of executable instructions to implement a first application. The plurality of executable instructions define a plurality of applications for the device. The method further includes the step of causing the display to enter the sleep mode after a first sleep time without receiving any user inputs, the first sleep time associated with the first application. The method further includes the steps of increasing the first sleep time responsive to a first user input received within a predetermined period of time after entry of the sleep mode and decreasing the first sleep time responsive to a second user input directing the display to enter the sleep mode before passage of the first sleep time.

A computing device in accordance with the present teachings is advantageous for example because the device adapts sleep times or screen timeouts to account for changes in applications, functions, or user preferences and tendencies. As a result, the device is less likely to enter sleep mode against the desires of a user during an application that requires limited user interaction (e.g., watching a video or reading an electronic book). The device will also enter sleep mode more quickly in circumstances of limited use of the device thereby conserving power. Further, the optimization of sleep times will further conserve power by reducing energy draws that occur during unwanted entry, and subsequent exit, into sleep mode.

The foregoing and other aspects, features, details, utilities and advantages of the present teachings will be apparent from reading the following description and claims, and from reviewing the accompanying drawings.

DETAILED DESCRIPTION OF EMBODIMENTS

Figure 1:
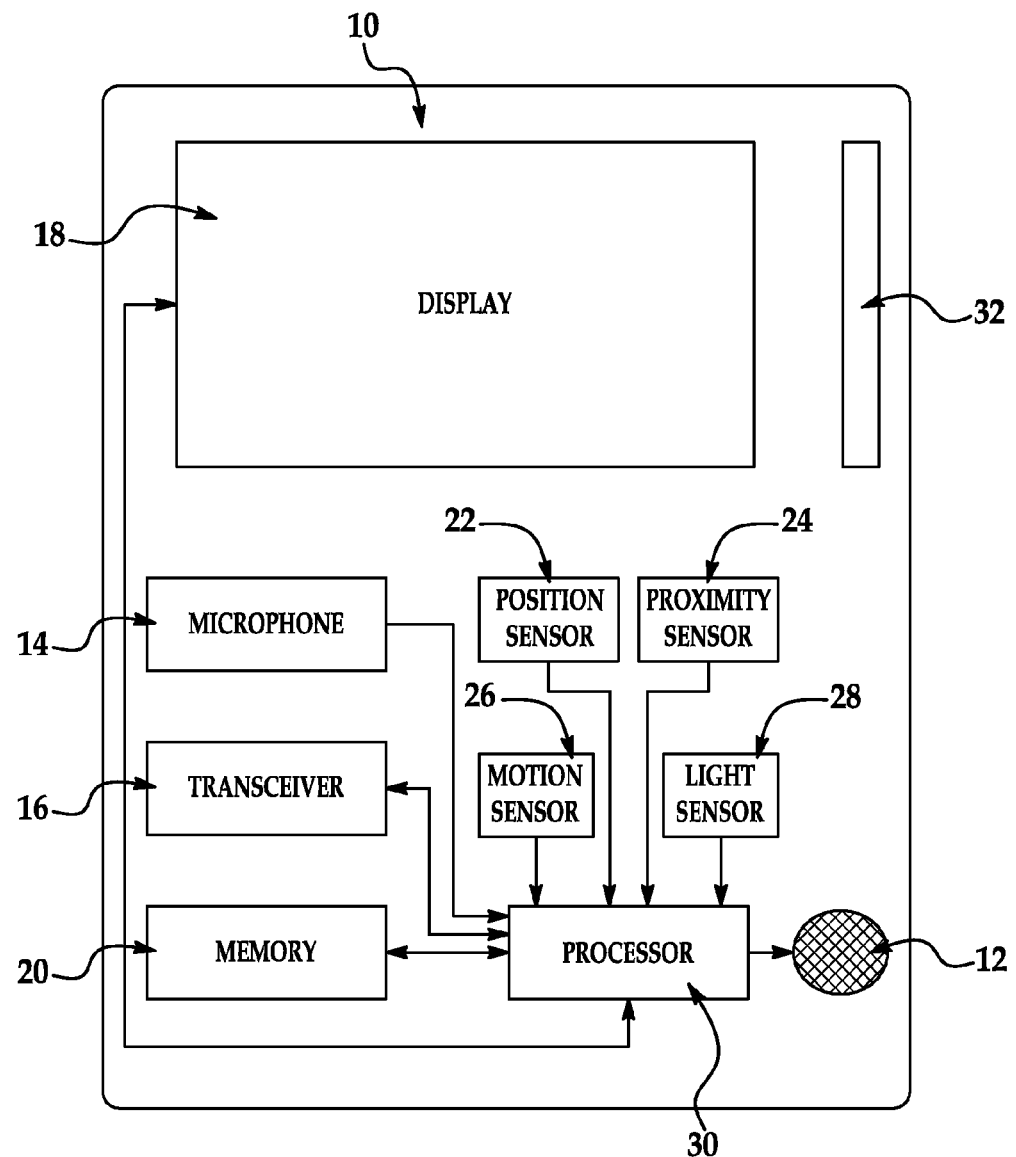
FIG. 1 is a diagrammatic view of a computing device in accordance with one embodiment of the present teachings.

Referring now to the drawings, FIG. 1 illustrates a computing device 10 in accordance with one embodiment of the present teachings. In the illustrated embodiment, device 10 comprises a mobile communication device and, in particular, a cellular phone. It should be understood, however, that device 10 may comprise any of a variety of both mobile and fixed computing devices employing display screens for input and/or output functions including, for example, tablet or laptop computers, desktop computers, vehicle interface systems (such as audio, navigation, and system controls associated with a vehicle), GPS systems, and so on. Device 10 may include cellular phone components including, for example, a speaker 12, a microphone 14, one or more transceivers 16, a display 18, and a memory 20. Although not illustrated, device 10 may further include components such as a battery and power management and signal processing circuitry. In accordance with various embodiments of the present teachings, device 10 may include one or more sensors including a position sensor 22, a proximity sensor 24, a motion sensor 26 and a light sensor 28 and an electronic control unit or processor 30.

Speaker 12 includes an electric to acoustic transducer that generates sound in response to electrical signals indicative of audio communications. Microphone 14 includes an acoustic to electric transducer that converts sound or mechanical vibration to electrical signals.

Transceivers 16 may comprise radio transceivers that transmit signals to and receive signals from an antenna 32 for wireless communication with a telecommunications network or another computing device. Transceivers 16 may form part of a network interface configured for connection to a telecommunications network (not shown) such as a cellular telecommunications network made available by a wireless provider and accessible by device 10, and/or the public internet, a local area network (LAN), wide area network (WAN), virtual private network (VPN) or other form of telecommunications network. Device 10 may access the network using one or more access points such as cellular base stations which may themselves be connected to a mobile telephone switching center that routes voice and data transmissions between device 10 and telephone landlines and network servers (not shown). Transceivers 16 may communicate with the access points using communication topologies including frequency, time and code division multiple access topologies (i.e. FDMA, TDMA, CDMA). One or more transceivers 16 may also be configured for short range wireless communication using short-range wireless technologies such as Wi-Fi (IEEE 802.11), Bluetooth, Zigbee, NFC (near field communications), etc.

Display 18 functions as an input/output device for the user of device 10. Display 18 may comprise, for example, a liquid crystal display or light emitting diode display. Display 18 provides a graphical user interface (GUI) to the user. Display 18 may function as only an output device with input received through other I/O devices such as a keyboard. Alternatively, display 18 may also function as an input device and may comprise a touch screen display including, for example capacitive and resistive touch screen displays.

Memory 20 is provided for storage of data and instructions or code (i.e. software) for processor 30. Memory 20 stores a plurality of executable instructions defining a plurality of applications for device 10. As used herein, an application refers to a software program providing a functional or entertainment value to an end user or enabling the user to perform a task (e.g., a word processing program, a spreadsheet program, a database, an electronic book reader, a video or other media player, a picture viewer, an internet browser, a game, etc.) In accordance with one embodiment of the present teachings, memory 20 may also include a computer program encoded thereon that when executed by processor 30 adjusts a sleep time for display 18 to enter a sleep mode restricting use of the graphical user interface on display 18. In connection with this program, memory 20 may store a plurality of sleep times with each sleep time associated with an application and even a particular task or function within the application. Memory 20 may define a data structure in which the sleep times, and information about the sleep times as discussed hereinbelow, is associated with applications and functions within the application such that the sleep times are easily accessible (e.g., a particular sleep time may be identified and retrieved by processor 30 based on an application that is running and/or a function that is being performed). Memory 20 may comprise various forms of non-volatile memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 20 may be internal to processor 30.

Position sensor 22 provides an indication of the relative geographic position of device 10. Sensor 22 may comprise a global positioning system (GPS) receiver and provides a precise geographic position for use in navigational and other applications on device 10. Sensor 22 receives signals from a plurality of satellites orbiting the Earth that enable sensor 22 to determine a precise longitude and latitude for device 10.

Proximity sensor 24 provides an indication of the proximity of a user to device 10. Sensor 24 may comprise any of a variety of sensors that emit electromagnetic radiation (e.g., infrared radiation) and detect a change in the reflected radiation. Alternatively, sensor 24 may comprise a light based sensor that measures the amount of ambient light (with less light being received as a user moves closer to the proximity sensor).

Motion sensor 26 provides an indication of movement of device 10 such as tilting, shaking, or rotation of device 10. Sensor 26 may comprise an accelerometer or a gyroscope. It should be understood that multiple motion sensors 26 may be employed within device 10 depending on the type of motion to be sensed.

Light sensor 28 provides an indication of an amount of light in the area of operation of device 10. Sensor 28 may measure the amount of ambient light to indicate, for example, time of day or location (within a building and outside of a building).

Processor 30 is provided to execute program instructions and control components of device 10 to implement various applications and, in accordance with the present teachings, to adjust a sleep time for display 18 of device 10 to enter a sleep mode restricting use of a graphical user interface of display 18. Processor 30 may comprise one or more programmable microprocessors or microcontrollers. Processor 30 may include a central processing unit (CPU), memory (such as memory 20) and an input/output (I/O) interface through which processor 30 may receive a plurality of input signals including signals generated by microphone 14, transceivers 16, display 18, and sensors 22, 24, 26, 28 and generate a plurality of output signals including those used to control and/or provide data to speaker 12, transceivers 16, and display 18.

In accordance with the present teachings, processor 30 may be configured with programming instructions from a computer program (i.e., software) to perform all or part of a method for adjusting a sleep time for display 18 to enter a sleep mode restricting use of a graphical user interface on display 18. The program may be stored in a non-transitory (i.e., not purely signal-based) computer storage product, such as a computer storage medium, which comprises all the features enabling the implementation of the methods described herein, and which when loaded in a computer system is able to carry out those methods. The computer storage medium may comprise memory 20 (which again may be internal to processor 30 of external to processor 30 as illustrated in FIG. 1). The program may be pre-installed in a computer storage medium on device 10 or may be obtained from a computer storage medium external to device 10. For example, processor 30 may download the program from another computing device such as an application server over a telecommunications network. As used herein, the term "server" refers to a computing device coupled to a telecommunications network and configured by programming instructions (i.e., software) to provide services to other computing devices (including other servers).

Figure 2:
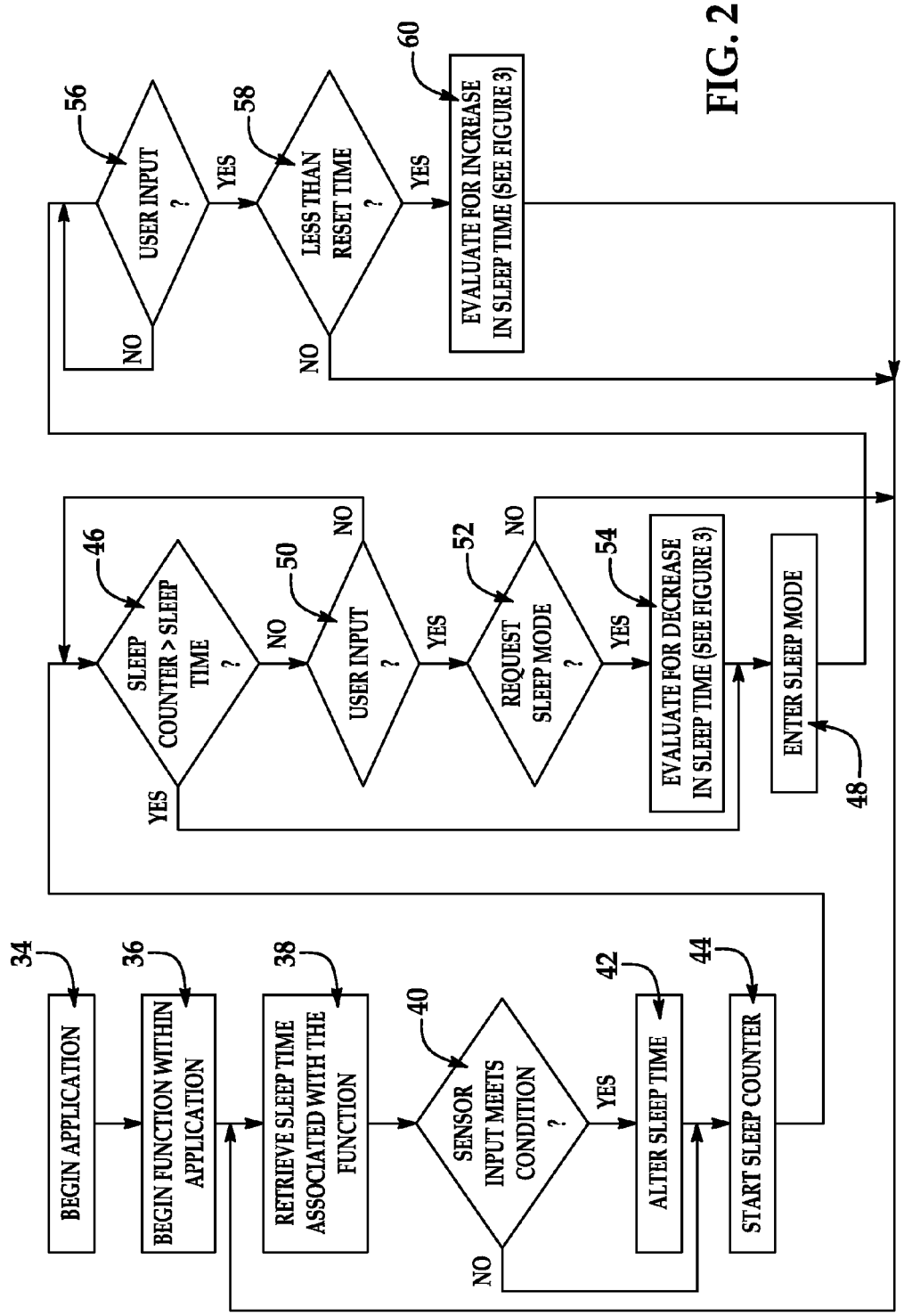
FIG. 2-3 are flowcharts illustrating embodiments of a process for adjusting a sleep time for a display of the computing device to enter a sleep mode restricting use of a graphical user interface of the display in accordance with the present teachings.

Referring now to FIG. 2, the operation of processor 30 and device 10 in accordance with one embodiment of the present teachings is illustrated. Device 10 may begin with the processes 34, 36 of executing a set of executable instructions to implement an application on device 10 and to implement a function within that application. The type of function will vary depending on the application. For example, in an electronic reader application, the function may comprise generating a list of books, selecting a book or reading the book among other functions. In an electronic mail application, the function might comprise generating a list of messages, selecting a message, reading a message or forming a message to be sent among other functions. It should be understood that a wide variety of functions will exist depending on the application.

Device 10 may continue with the process 38 of retrieving a sleep time associated with the application and function from memory 20. As discussed above, memory 20 may define a data structure that associates a sleep time with each application and, further, with each function within an application. Processor 30 may retrieve the sleep time from this data structure based on the application being run and/or the function within the application that is being performed.

In accordance with one aspect of the present teachings, a sleep time may be altered based on a variety of conditions sensed by device 10 (FIG. 1). Accordingly, processor 30 may perform the processes 40, 42 of determining whether an input signal from a sensor such as any of sensors 22, 24, 26, 28 (FIG. 1) meets a predetermined condition and, if so, altering the sleep time. For example, position sensor 22 may indicate that a user of device 10 has moved locations (e.g., from one time zone to another) and may increase or decrease a sleep time based on the likelihood of use of an application or function (e.g. because of a change in business hours). Proximity sensor 24 may indicate that the user is transmitting and receiving voice communications based on the proximity of the user to device 10 and may decrease sleep times (because other applications are less likely to be used) or increase sleep times (to prevent undesired entry of sleep mode during a short call) depending on user preferences. Motion sensor 26 may indicate that that device 10 is oriented in such a way that certain applications (e.g., video players or e-readers) are more likely to be used than others and adjust sleep times for various applications accordingly. Light sensor 28 may indicate time of day and processor 30 may again adjust sleep times based on the likelihood of use of different applications or functions. Although the embodiment shown in FIG. 2 illustrates processes 40, 42 as occurring at a particular point in time relative to other processes, it should be understood that processes 40, 42 could be implemented at a variety of different times and sequences relative to the other illustrated processes.

Once the sleep time for the application and function has been determined, processor 30 may execute a process 44 in which a counter is initiated and a process 46 in which the counter is continuously checked to determine whether counter has exceeded the sleep time. The counter may be based on a clock (e.g., a crystal oscillator) used for other functions by processor 30. If the counter exceeds the sleep time, processor 30 executes a process 48 to cause device 10 to enter sleep mode and restrict use of the graphical user interface of display 18 (e.g., to "lock" the interface and prevent further inputs until a request to "unlock" the interface is received).

Prior to entry of sleep mode, processor 30 may also execute a process 50 by which processor 30 continuously monitors for a user input. In the absence of any user input, processor 30 continues to implement process 46 to determine whether to enter sleep mode. If a user input is received, however, processor 30 executed a process 52 to determine the nature of the user input and, in particular, whether the input is a request by the user to enter sleep mode prior to passage of the sleep time. If the input is not a request to enter sleep mode, processor 30 returns to process 38, retrieves a sleep time based on the application and function (which may have changed depending on the user input or may have remained the same) and the above-recited processes are performed again. If the input is a request to enter sleep mode, however, processor 30 first executes a process 54 (discussed in greater detail hereinbelow) by which the sleep time may be reduced to better configure the sleep time for an individual user. For example, various users may, due to technical proficiency or experience over time, perform certain user interactions with device 10 more quickly than others and may direct device 10 to enter sleep mode before the default sleep time in order to conserve power. During process 54, processor 30 may decrease the sleep time so that device 10 enters sleep mode more quickly when the same or a similar application and function are implemented in the future so that the user is not required to manually enter sleep mode. The adjusted sleep time may be stored in memory 20 and associated with the corresponding application and function thereby replacing the sleep time retrieved in process 38. Following process 54, processor 30 implements process 48 and device 10 enters sleep mode.

While in sleep mode processor 30 may executes processes 56, 58 whereby processor 30 continuously monitors for a user input (such as a command to "wake up" from sleep mode or "unlock" the display 18) and determines whether that input meets a predetermined condition relative to a predetermined period of time (e.g., occurs in less time than the predetermined period of time) after entering sleep mode. If the user input is not received before the predetermined time, then the sleep time for the active application and function when sleep mode was entered may be considered appropriate for that application and function and processor 30 may return to process 38. Receiving the user input prior to the predetermined time, however, may indicate that the user did not wish to enter sleep mode despite not having submitted an input earlier. For example, certain applications or functions (watching a video, reading an electronic book or news article, etc.) will not involve frequent input, but rather passive viewing of the display 18. Further, users may perform certain tasks (e.g., reading) at different rates. Therefore, if the user input is received prior to the predetermined time, processor 30 may executed a process 60 (discussed in greater detail hereinbelow) by which the sleep time may be increased to better configure the sleep time for an individual user.

Figure 3:
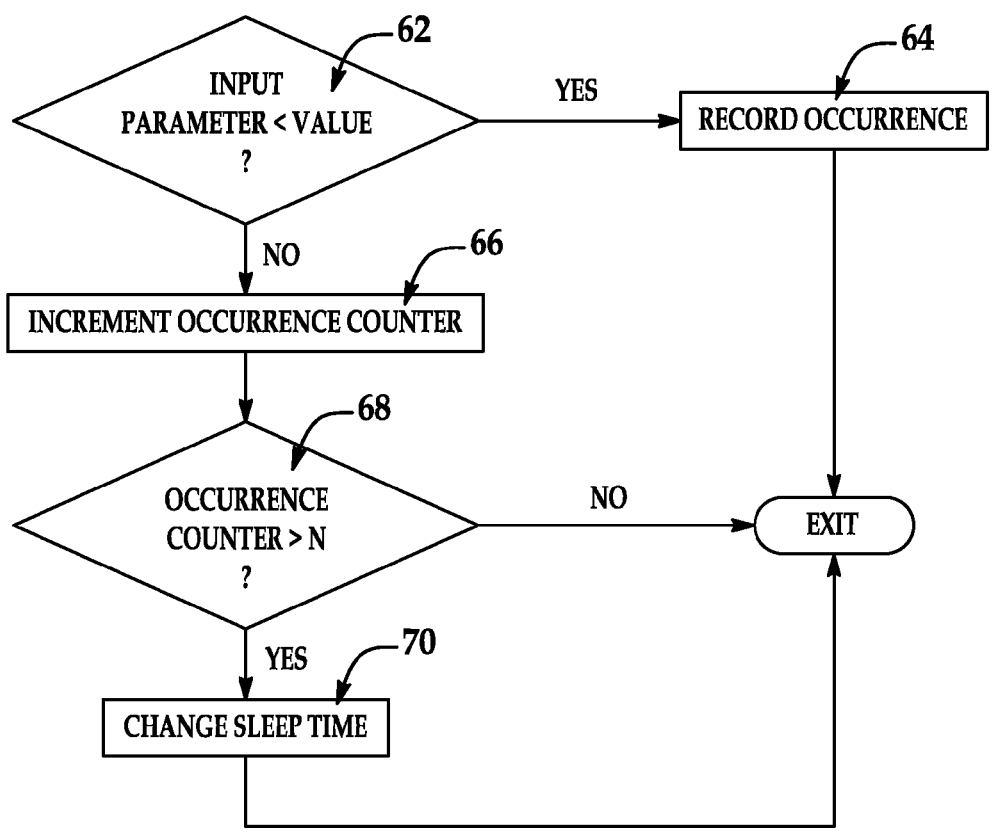

Processes 54 and 60 may include several subprocesses to determine whether to decrease or increase a sleep time responsive to the user input. With reference to FIG. 3, these subprocesses may, for example, begin with the subprocess 62 of determining whether a parameter associated with the user input meets a predetermined condition relative to a value for that parameter. In one embodiment, the parameter comprises the timing of the user input. In certain circumstances, the timing of the user input may indicate an unusual circumstance that should not be taken into account (i.e., filtered) in determining whether to change a sleep time. For example, a user may implement a particular application and function and then immediately be interrupted by an external event such that the user directs device 10 to enter sleep mode. Such an occurrence is not reflective of a user's preference or tendencies, but rather results from an outside influence. Subprocess 62 may be used to identify such occurrences and avoid alteration to the current sleep time for the application and function. If such an occurrence is identified, the occurrence may be recorded in subprocess 64 (so that adjustment to the sleep time can be reconsidered if there are multiple similar occurrences) or simply ignored. Although the timing of the user input is described as the relevant parameter above, it should be understood that other parameters may also be relevant to the determination.

If subprocess 62 determines that the relevant parameter meets the predetermined condition relative to the predetermined value for the parameter, processor 30 may implement the subprocesses 66, 68 of incrementing a counter and determining whether the counter meets a predetermined condition relative to a predetermined value (e.g., is equal to the predetermined value). Subprocesses 66, 68 may provide a more gradual adjustment of sleep times by allowing adjustments only when a certain user input has occurred on multiple occasions. Subprocesses 66, 68 therefore provide a method of filtering or smoothing the data resulting from the user inputs to insure that sleep times are adjusted appropriately. If subprocess 68 determines that the counter has not met the predetermined condition, no adjustment is made. If subprocess 68 determines that the counter has met the predetermined condition, processor 30 may implement the subprocess 70 of changing the sleep time (i.e., decreasing or increasing the sleep time depending on the circumstances). In changing the sleep time, processor 30 may decrease or increase the sleep time in a variety of ways. Processor 30 may decrease or increase the sleep time by a predetermined amount each time, by an amount that changes each time (e.g., a large increase, followed by a smaller increase, and an even smaller increase, etc.), or by an amount that is a function one or both of the original sleep time or the timing of the user input.

Processor 30 may further be configured to adjust (e.g., increase or decrease) the sleep times associated with multiple applications responsive to a single user input. For example, multiple applications may have a functional relationship in which the execution of one application results in the execution of another application or in which the execution of both applications requires execution of the one or more of the same executable instructions or in which both applications have a common functionality (e.g., both applications are involved in video playback). Based on this functional relationship, processor 30 may be configured to adjust a sleep times associated with one application when a different sleep time associated with the functionally related application is adjusted.

A computing device 10 in accordance with the present teachings is advantageous, for example, because it adapts sleep times or screen timeouts to account for changes in applications, function, or user preferences and tendencies. As a result, the device is less likely to enter sleep mode against the desires of a user during an application that requires limited user interaction (e.g., watching a video or reading an electronic book). The device will also enter sleep more quickly in circumstances of limited use of the device thereby conserving power. Further, the optimization of sleep times will further conserve power by reducing energy draws that occur during unwanted entry, and subsequent exit, into sleep mode.

Although one or more particular embodiments been shown and described, it will be understood by those of skill in the art that various changes and modifications can be made without departing from the spirit and scope of the present teachings.

What is claimed is:

1. A computing device, comprising:
    a display providing a graphical user interface;
    a memory storing:
        a plurality of executable instructions defining a plurality of applications for the device; and,
        a plurality of sleep times, each sleep time of the plurality of sleep times associated with an application of the plurality of applications;
    a processor configured to:
        execute a first set of the plurality of executable instructions to implement a first application of the plurality of applications;
        cause the display to enter a sleep mode restricting use of the graphical user interface after a first sleep time without receiving any user inputs, the first sleep time associated with the first application;
        increase the first sleep time to an adjusted longer sleep time responsive to a first user input received within a predetermined period of time after entry of the sleep mode, and storing the adjusted longer sleep time associated with the first application thereby replacing the first sleep time; and,
        decrease the first sleep time to an adjusted shorter sleep time responsive to a number of multiple occurrences above a predetermined value of a second user input received by the display directing the display to enter the sleep mode before passage of the first sleep time, and storing the adjusted shorter sleep time associated with the first application thereby replacing the first sleep time.

2. The computing device of claim 1 wherein the processor is further configured to:
    execute a second set of the plurality of executable instructions to implement a second application of the plurality of applications;
    cause the display to enter the sleep mode after a second sleep time without receiving any user inputs, the second sleep time associated with the second application;
    increase the second sleep time responsive to a third user input received within a predetermined period of time after entry of the sleep mode; and,
    decrease the second sleep time responsive to a fourth user input directing the display to enter the sleep mode before passage of the second sleep time.

3. The computing device of claim 2 wherein the second sleep time is different than the first sleep time.

4. The computing device of claim 1 wherein each sleep time of the plurality of sleep times is further associated with a function from among a plurality of functions associated with the application with which the sleep time is associated.

5. The computing device of claim 1 wherein the processor is further configured, in increasing the first sleep time, to increment a counter responsive to each instance of the first user input and to increase the first sleep time when the counter meets a predetermined condition relative to a predetermined value.

6. The computing device of claim 1 wherein the processor is further configured, in increasing the first sleep time, to compare a value for a parameter associated with the first user input to a predetermined value and to increase the first sleep time when the parameter value meets a predetermined condition relative to the predetermined value.

7. The computing device of claim 1, further comprising a position sensor, the processor further configured to alter the first sleep time responsive to a signal generated by the position sensor.

8. The computing device of claim 1, further comprising a proximity sensor, the processor further configured to alter the first sleep time responsive to a signal generated by the proximity sensor and indicative of the proximity of a user to the device.

9. The computing device of claim 1, further comprising a motion sensor, the processor further configured to alter the first sleep time responsive to a signal generated by the motion sensor and indicative of movement of the device.

10. The computing device of claim 1, further comprising a light sensor, the processor further configured to alter the first sleep time responsive to a signal generated by the light sensor and indicative of an amount of light in an area of operation of the device.

11. The computing device of claim 1 wherein the processor is further configured to:
execute a second set of the plurality of executable instructions to implement a second application of the plurality of applications;
cause the display to enter the sleep mode after a second sleep time without receiving any user inputs, the second sleep time associated with a second application; and,
adjust the second sleep time responsive to one of the first and second user inputs.

12. The computing device of claim 11 wherein the second application has a functional relationship to the first application.

13. A computing device, comprising:
a display providing a graphical user interface;
a processor configured to:
cause the display to enter a sleep mode restricting use of the graphical user interface after a predetermined sleep time without receiving any user inputs;
increase the predetermined sleep time to an adjusted longer sleep time responsive to a first user input received within a predetermined period of time after entry of the sleep mode, and storing the adjusted longer sleep time as a replacement for the predetermined sleep time; and,
decrease the first sleep time to an adjusted shorter sleep time responsive to a number of multiple occurrences above a predetermined value of a second user input received by the display directing the display to enter the sleep mode before passage of the first sleep time, and storing the adjusted shorter sleep time associated with the first application thereby replacing the first sleep time.

14. The computing device of claim 13 wherein the processor is further configured, in increasing the sleep time, to increment a counter responsive to each instance of the first user input and to increase the sleep time when the counter meets a predetermined condition relative to a predetermined value.

15. The computing device of claim 13 wherein the processor is further configured, in increasing the sleep time, to compare a value for a parameter associated with the first user input to a predetermined value and to increase the sleep time when the parameter value meets a predetermined condition relative to the predetermined value.

16. The computing device of claim 13, further comprising a position sensor, the processor further configured to alter the sleep time responsive to a signal generated by the position sensor.

17. The computing device of claim 13, further comprising a proximity sensor, the processor further configured to alter the sleep time responsive to a signal generated by the proximity sensor and indicative of the proximity of a user to the device.

18. The computing device of claim 13, further comprising a motion sensor, the processor further configured to alter the sleep time responsive to a signal generated by the motion sensor and indicative of movement of the device.

19. The computing device of claim 13, further comprising a light sensor, the processor further configured to alter the sleep time responsive to a signal generated by the light sensor and indicative of an amount of light in an area of operation of the device.

20. An article of manufacture, comprising:
a non-transitory computer storage medium having a computer program encoded thereon that when executed by a processor in a computing device adjusts a sleep time for a display of the computing device to enter a sleep mode restricting use of a graphical user interface of the display, the computer program including code for:
executing a first set of a plurality of executable instructions defining a plurality of applications for the computing device, the first set of instructions implementing a first application of the plurality of applications;
causing the display to enter the sleep mode after a first sleep time without receiving any user inputs, the first sleep time associated with the first application;
increasing the first sleep time to an adjusted longer sleep time responsive to a first user input received within a predetermined period of time after entry of the sleep mode, and storing the adjusted longer sleep time associated with the first application thereby replacing the first sleep time; and,
decrease the first sleep time to an adjusted shorter sleep time responsive to a number of multiple occurrences above a predetermined value of a second user input received by the display directing the display to enter the sleep mode before passage of the first sleep time, and storing the adjusted shorter sleep time associated with the first application thereby replacing the first sleep time.

21. The article of manufacture of claim 20 wherein the computer program further includes code for:
executing a second set of the plurality of executable instructions to implement a second application of the plurality of applications;

causing the display to enter the sleep mode after a second sleep time without receiving any user inputs, the second sleep time associated with the second application;

increasing the second sleep time responsive to a third user input received within a predetermined period of time after entry of the sleep mode; and, decreasing the second sleep time responsive to a fourth user input directing the display to enter the sleep mode before passage of the second sleep time.

22. The article of manufacture of claim 20 wherein said code for increasing the first sleep time includes code for incrementing a counter responsive to each instance of the first user input and increasing the first sleep time when the counter meets a predetermined condition relative to a predetermined value.

23. The article of manufacture of claim 20 wherein said code for increasing the first sleep time includes code for comparing a value for a parameter associated with the first user input to a predetermined value and increasing the first sleep time when the parameter value meets a predetermined condition relative to the predetermined value.

24. A method for adjusting sleep times for a display of a computing device to enter a sleep mode restricting use of a graphical user interface on the display, comprising the steps of:

executing a first set of a plurality of executable instructions to implement a first application, the plurality of executable instructions defining a plurality of applications for the device;

causing the display to enter the sleep mode after a first sleep time without receiving any user inputs, the first sleep time associated with the first application;

increasing the first sleep time to an adjusted longer sleep time responsive to a first user input received within a predetermined period of time after entry of the sleep mode, and storing the adjusted longer sleep time associated with the first application thereby replacing the first sleep time; and, decrease the first sleep time to an adjusted shorter sleep time responsive to a number of multiple occurrences above a predetermined value of a second user input received by the display directing the display to enter the sleep mode before passage of the first sleep time, and storing the adjusted shorter sleep time associated with the first application thereby replacing the first sleep time.

25. The method of claim 24, further comprising the steps of:

executing a second set of the plurality of executable instructions to implement a second application of the plurality of applications;

causing the display to enter the sleep mode after a second sleep time without receiving any user inputs, the second sleep time associated with the second application;

increasing the second sleep time responsive to a third user input received within a predetermined period of time after entry of the sleep mode; and, decreasing the sleep time responsive to a fourth user input directing the display to enter the sleep mode before passage of the second sleep time.

26. The method of claim 25 wherein the second sleep time is different than the first sleep time.

27. The method of claim 24 wherein the first sleep time is further associated with a function from among a plurality of functions associated with the application with which the first sleep time is associated.

28. The method of claim 24 wherein the increasing step includes the sub steps of:

incrementing a counter responsive to each instance of the first user input; and, increasing the first sleep time when the counter meets a predetermined condition relative to a predetermined value.

29. The method of claim 24 wherein the increasing step includes the sub steps of:

comparing a value for a parameter associated with the first user input to a predetermined value; and, increasing the first sleep time when the parameter value meets a predetermined condition relative to the predetermined value.

30. The method of claim 24, further comprising the steps of:

executing a second set of the plurality of executable instructions to implement a second application of the plurality of applications;

causing the display to enter the sleep mode after a second sleep time without receiving any user inputs, the second sleep time associated with a second application; and, adjusting the second sleep time responsive to one of the first and second user inputs.

* * * * *